Patented Feb. 11, 1941

2,231,754

UNITED STATES PATENT OFFICE 2,231,754

PROCESS FOR RESOLVING PETROLEUM EMULSIONS

Melvin De Groote, University City, and Bernhard Keiser and Charles M. Blair, Jr., Webster Groves, Mo., assignors to Petrolite Corporation, Ltd., Wilmington, Del., a corporation of Delaware No Drawing. Application July 13, 1939, Serial No. 284,378

3 Claims. (Cl. 252—341)

This invention relates primarily to the treatment of emulsions of mineral oil and water, such as petroleum emulsions, for the purpose of separating the oil from the water.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion, our process being particularly adapted to the resolution of crude oil emulsions of the kind obtained in connection with the treatment or the flooding of subterranean oil-bearing strata by means of aqueous agents or the like.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned are of significant value in removing impurities, particularly inorganic salts, from pipeline oil.

The process which constitutes one feature of our present invention consists in subjecting a petroleum emulsion of the water-in-oil type to the action of a demulsifying agent, thereby causing the emulsion to break and separate into its component parts of oil and water or brine when the emulsion is permitted to remain in a quiescent state, after treatment, or is subjected to other equivalent separatory procedure. The demulsifying agent employed in the said process consists of a chemical compound obtained by acylation of a hydroxy amino-ether. Such acylation reaction is conducted in such a manner as to introduce an acyl radical derived from a monocarboxy detergent-forming acid. Such acids are characterized by having at least 8 carbon atoms and not more than 32 carbon atoms, and are exemplified by fatty acids, naphthenic acids, abietic acids, or the like, or by simple modifications thereof which do not detract from the ability of the acid to combine with alkali to produce soap or soap-like materials. For instance, hydrogenated oleic acid, chlorinated naphthenic acid, or brominated abietic acid will form such detergent-like bodies with the same ease as the parent materials themselves. The oxidized acids obtained by blowing or oxidation of the acids or esters are satisfactory. Such acids have frequently been referred to collectively in the art as monocarboxy detergent-forming acids. Needless to say, the acylation need not be conducted by means of the acid itself, but may be conducted by means of any compound of the acid which contains the acyl radical; for instance, an ester, an amide, an anhydride, an acyl chloride, etc.

Common polyhydric alcohols include the glycols and glycerols. These polyhydric alcohols are characterized by the ease with which two or more molecules combine with the elimination of water to form polyglycols, polyglycerols, or the like. These compounds are sometimes referred to as ether alcohols, because the typical ether linkage, carbon-oxygen-carbon, appears at least once in such compounds. It is known that certain hydroxyamines, particularly alkanolamines containing alkanol radicals, enter into the same kind of reaction with the formation of a hydroxylated amino ether. Possibly the commonest example of an alkanolamine is an ethanolamine, particularly diethanolamine and triethanolamine. It may be well to point out that the compounds herein contemplated as demulsifying agents are derived from basic compounds, that is, compounds in which the basicity approximates that of the parent hydroxyamine. Such basic amines are characterized by the fact that there is no aryl group directly attached to an amino nitrogen group, unless there be present at least one other amino radical capable of contributing a basic quality. In other words, a hydrogen atom attached to an amino nitrogen atom may remain as such, or may be replaced by an alkyl radical, an alicyclic radical, or an aralkyl radical, or there may be present a hydroxy alkyl radical, a hydroxy alicyclic radical, or a hydroxy aralkyl radical directly attached to the amino nitrogen atom. Furthermore, such hydroxy hydrocarbon radicals may be acylated with lower aliphatic acids containing at least two carbon atoms and not more than 7 carbon atoms. Such acids include acetic acid, butyric acid, heptoic acid, etc. In the event that an amino nitrogen atom appears in which an aryl radical is directly attached to said amino nitrogen atom, as in the case of phenyl diethanolamine, then the presence of such non-basic amino nitrogen atom must be ignored and the compound must contain at least one amino nitrogen atom of a basic character elsewhere in the molecule. Other similar aryl alkanolamines, such as diphenyl ethanolamine, naphthyldiethanolamine, phenyldipropanolamine, etc., may be used, subject to the above mentioned provision.

In the following table of compounds, the letter T indicates an amino hydrogen atom, or any one of the substituents which have been suggested as satisfactory to replace an amino hydrogen atom. The following table is submitted purely by way of illustration and indicates only a small portion of the various materials which may be acylated with a detergent-forming monocarboxy acid to provide demulsifying agents of the kind employed in the present process:

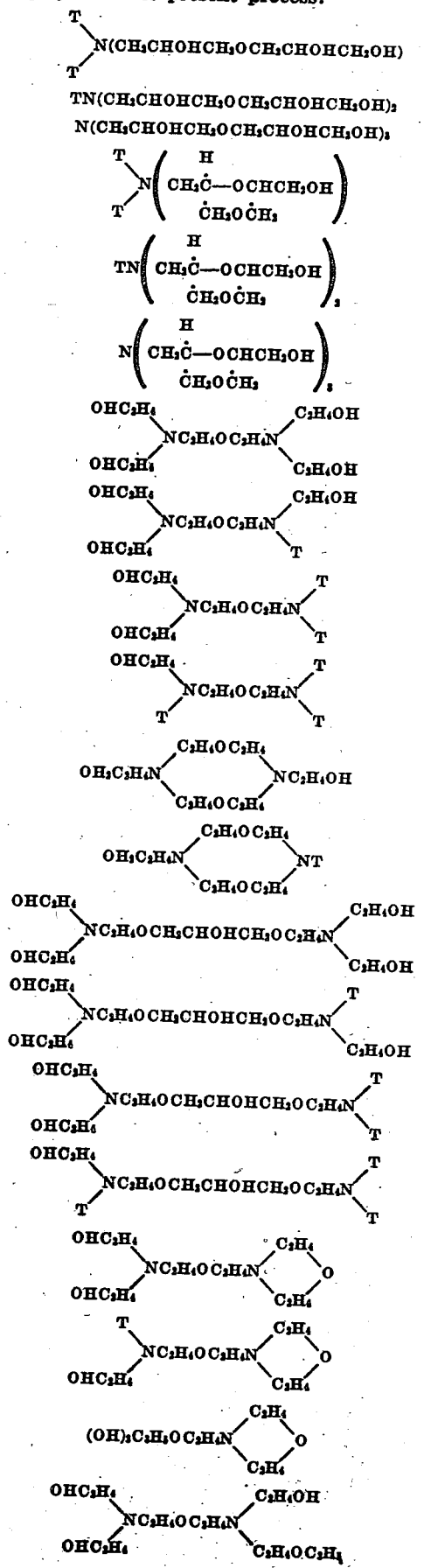

In the above table, it is understood that where the radical $C_2H_4$ occurs, it may be replaced by any other suitable radical, such as a $C_3H_6$, $C_4H_8$ radical, etc. Furthermore, it may be replaced by a residue from a cyclohexyl radical, or a residue from a benzyl radical or the like. Similarly, where the glycerol radical appears, a homolog may be substituted instead, as, for example, betamethyl glycerol or the tetrahydroxyl derivative thereof. It is unnecessary to differentiate between isomeric forms; and in some instances, one may have polymeric forms containing a large number of residues derived from polyhydric alcohols or hydroxyamines, and of such a kind that there are present perhaps 20, 30, 40, or even 50 residues from the parent material or materials which contribute to the formation of the final molecule. Continuous etherization is considered as being polymerization, for purposes of convenience. Such polymers may be considered a repetition of the monomer, taken any convenient number of times—for instance, two to twenty times. It is also to be noted that the molecule may be joined by more than one ether linkage in parallel. As previously stated, phenyl diethanolamine or similar compounds may enter into the final molecule. Similarly, morpholine or ethanol morpholine may be employed. Morpholine may be considered as contributing the basic amino nitrogen atom. In each and every instance the compound is characterized by having present at least one basic nitrogen atom, i. e., a nitrogen atom unattached to any aryl radical and at least one hydroxylated hydrocarbon radical generally derived from an alkanolamine or from a glycerylamine, such as monoglycerylamine, diglycerylamine, or triglycerylamine.

As to the manufacture of such compounds, one need only point out that some of them are well known compositions of matter. Others can be produced if desired in the same manner employed to produce those which are well known. One method of producing such compounds is to heat the desired products under suitable conditions, so as to cause dehydration to take place. Another method is to treat the selected amine with a product such as an alkylene oxide, including ethylene oxide, or with a product such as glycidol. Other methods involving dehydration in presence of an acidic agent, for instance, dehydration of two moles of diethanolamine so as to produce the ether type compound instead of morpholine, may be employed. It is possible that some of the types indicated above, like other organic compounds, are difficult to prepare, but their derivatives can be prepared more readily. In other words, since an acylated product is desired, it is feasible, in some instances, to prepare the acylated product by uniting a partially esterified polyhydric alcohol with a partially esterified alkylolamine, or by use of an equivalent method. This particular method of producing the desired type of chemical compound will be discussed subsequently.

Attention is directed to the co-pending application for patent, Serial No. 273,278, of Melvin De Groote and Bernhard Keiser, filed May 13, 1939. This particular co-pending application teaches a convenient method for making some of the compounds of the kind previously indicated. The said method involves essentially the conversion of an ethanolamine or the like, such as triethanolamine, into a mono- or dialcoholate, and the reaction of the alcoholate with a halohydrin, such as glycerol chlorhydrin or glycerol dichlorhydrin. The alcoholates may be indicated by the following formulas:

Such alcoholates react so as to liberate the alkali metal halide, such as sodium chloride or potassium chloride. Said co-pending application illustrates, for example, the manufacture of materials of the following type by means of such reaction:

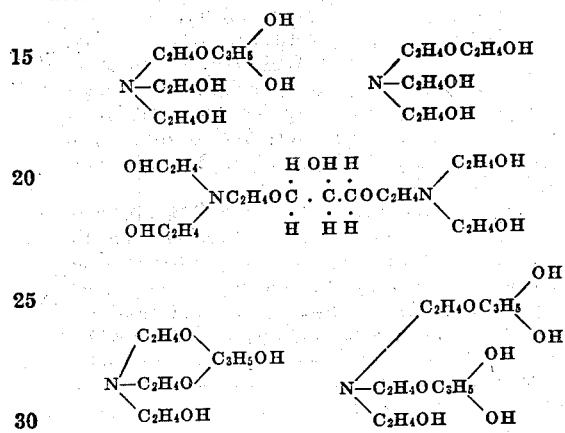

It is to be noted that the chlorhydrin involved may of itself be acylated, and thus compounds are derivable which are characterized by the presence of an acyl radical obtained from acids having either less than 8 carbon atoms or more than 8 carbon atoms. The following excerpt is taken verbatim from said aforementioned application:

"It has been previously pointed out that one may obtain acylated derivatives of the amino ethers by use of the acylated alcoholate derived by utilization of metallic sodium or potassium or the like. In such compounds the acyl radical is attached directly to the tertiary amine residue or radical. However, if one employs an esterified chlorhydrin, i. e., the chlorhydrin derived from monoacetin, monostearin, monoabietin, mononaphthenin, or the like, one obtains a chlorhydrin of the following composition:

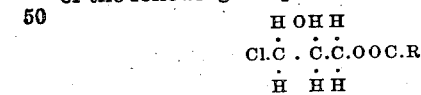

in which R.CO is the acyl radical derived from R.COOH, which represents an acid of the kind previously described. By employing such acylated halohydrin or chlorhydrin, one can use reactants which include reactions of the following type:

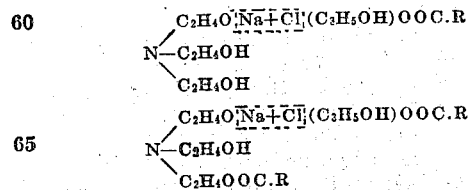

The above reactions can only be conducted in the absence of free alkali."

The following example for preparing a hydroxy amino-ether is taken verbatim from said co-pending application Serial No. 273,278:

"100 pounds of commercial triethanolamine containing 2½% monoethanolamine and 15% diethanolamine, are treated with 133 pounds of a 60% solution of caustic soda (i. e., 80½ lbs. NaOH dissolved in 53 lbs. of water), so as to yield a pasty or semisolid mass containing substantially no free or relatively little free alkali. The wet mass is then reacted with extreme care, as previously noted, with commercial glycerol monochlorhydrin. After completion of reaction, the sodium chloride formed is separated by filtration and hydraulic pressure. The final product represents a compound of technical purity and has the following composition:

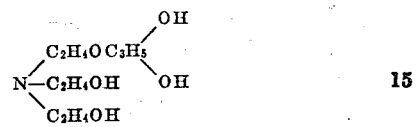

In the hereto appended claims no reference is made to the fact that the alcoholate is employed in substantial absence of alkali, because it is deemed unnecessary to indicate that this condition is the most desirable. The objection to an excess of alkali is the destruction of the chlorhydrin and the formation of a polyhydric alcohol or the like, which appears in the completed product. Naturally, there is no objection to small amounts of excess alkali whose significance is not appreciable. It is to be noted in the claims that no reference is made to separation of the alcoholate from water, excess alkali, unreacted amine, etc., which may be present, although as previously indicated, such separatory procedure may be followed if desired."

Having prepared a hydroxy amino-ether of the kind previously described, the second step in the manufacture of the demulsifying agent employed in our present process, is to acylate such a product so as to introduce an acyl radical derived from a detergent-forming monocarboxy acid. For purposes of convenience, such monocarboxy acid may be indicated by the formula R'.COOH and the acyl group by R'.CO. It has already been indicated that acylation may be conducted by use of the acid itself, or by use of any suitable compound containing the acyl radical in labile form.

Attention is directed to U. S. Patents Nos. 2,154,422 and 2,154,423, to De Groote, Keiser and Blair, both dated April 18, 1939. Both of said patents are concerned with products derived by esterification between intermediate amines containing an alcoholic hydroxy group and phthalic anhydride. It is necessary in the instances described in said patents that an alcoholic hydroxyl radical be present in reaction with phthalic anhydride. Insofar that the acylated amino-ethers herein contemplated as demulsifying agents need not be esterified with phthalic anhydride or the like, it is apparent that no alcoholic hydroxyl radical need be present, and that acyl radicals may be introduced so that there is no residual hydroxyl radical attached either to a hydrocarbon radical or to an acyl radical, such as a hydroxyl radical which is part of a ricinoleyl radical. Furthermore, it is apparent that even when acylation is accompanied with an acid having no hydroxyl radicals, for instance, stearic acid, oleic acid, naphthenic acid, or the like, then, in that event, one may acylate a hydroxy amino-ether having only one free hydroxyl radical. A person skilled in the art will readily understand how to employ the methods and compounds described in said two aforementioned patents to prepare acylated derivatives from hydroxy amino-ethers of the kind above described and the selected detergent-forming monocarboxy acid compound. Said patents indicate the following amines which may be employed:

Diethanolamine, monoethanolamine, ethyl ethanolamine, methyl ethanolamine, propanolamine, dipropanolamine, propyl propanolamine; cyclohexanolamine, dicyclohexanolamine, cyclohexylethanolamine, cyclohexyl propanolamine, benzyl ethanolamine, benzyl propanolamine, pentanolamine, hexanolamine, octyl ethanolamine, octadecyl ethanolamine, cyclohexanol ethanolamine; triethanolamine, diethanolalkylamines, such as diethanol ethylamine, diethanol propylamine; diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolamine, dibenzyl ethanolamine, benzyl dipropanolamine, tripentanolamine, trihexanolamine, ethyl hexyl ethanolamine, octadecyl diethanolamine, polyethanolamine, mono, di and triglycerylamine, etc.

Attention is also directed to the two aforementioned patents to the extent that they disclose and describe various glycerylamines and the method of manufacturing the same. Such methods obviously are applicable to derivatives of the kind previously mentioned, such as beta methyl glycerol, beta propyl glycerol, beta ethyl glycerol, etc., as well as derivatives of the tetrahydroxyl compounds obtainable therefrom.

It has been previously pointed out that the chemical compounds or demulsifying agents employed in the present process need not necessarily be manufactured by first preparing the hydroxy amino-ether, and subsequently acylating the same. As a matter of fact, in many instances it is more convenient to acylate the desired polyhydric alcohol or the desired hydroxy amine and then combine the two acylated molecules or acylate one type of compound and combine with the unacylated molecule of the other type. Indeed, an examination of what has been said previously and an examination of the method suggested hereinafter indicates that one can proceed to produce a compound in which the acylated radical derived from the detergent-forming radical is produced at whatever point is desired. In other words, it may be introduced only in one or more hydroxy amino residues which are present; or the acyl radical may be introduced only in one or more polyhydric alcohol residues which are present; or it may be introduced both into the hydroxyamino residues which are present and into the polyhydric alcohol residue which is present. As previously pointed out, if desired, the acyl radical may be introduced more than once into the same hydroxyamino residue, or into the polyhydric alcohol residue, provided there are available sufficient alcoholic hydroxyls for such combination.

Acylation, of course, is identical with esterification for the purposes of the present description. In other words, instead of replacing the hydrogen atom of a hydroxyl group by an acyl radical, one can assume that the complete hydroxyl radical has been replaced by an oxyacyl radical, i. e., a fatty acid radical; and thus the product may be referred to as esterified. Using such nomenclature, one can refer to an alkylolamine as being partially esterified with a selected detergent-forming monocarboxy acid or a polyhydric alcohol as being partially esterified. The manufacture of partially esterified alcohols, such as superglycerinated fats, is well known; and such compounds have considerable utility in the arts. Needless to say, the same method employed for producing superglycerinated fats may be employed in connection with one polyhydric alcohol and may be employed in connection with other acids instead of fatty acids, for instance, the other non-fatty detergent-forming monocarboxy acid, such as abietic acid, naphthenic acid, and the like. In view of this fact, no description is necessary as to the method of preparing partially esterified polyhydric alcohols from detergent-forming acids of the kind described. Furthermore, no description is necessary as to the method of preparing partially esterified alkanolamines, in view of what has been said previously and particularly in view of the complete description of equivalent acylation procedure, which appears in the aforementioned United States Patents Nos. 2,154,422 and 2,154,423.

Reference is made to our co-pending application for patent Serial No. 208,220, filed May 16, 1938. Said co-pending application describes compounds obtainable by a method which comprises heating a partially esterified tertiary alkylolamine with a polyhydric alcohol to a temperature in excess of 100° C. for a period of time sufficient to cause condensation with elimination of water and the production of an ethereal reaction product. Although said application is concerned largely with derivatives of fatty acids, needless to say, the same procedure may be applied to comparable compounds derived from naphthenic acid or abietic acid or the like. This is also true in regard to the preparation of subsequent Examples 4–10 inclusive. The following three examples appear in said co-pending application:

"*Example 1.*—Commercial triethanolamine and cocoanut oil, in the proportions of 1 mole of cocoanut oil to 3 moles of triethanolamine are heated to a temperature between about 160° C. and 180° C. for about two hours. The resulting product consists mainly of the mono-fatty acid ester of triethanolamine, with minor proportions of the di-fatty acid ester, the tri-fatty acid ester, glycerin, etc. To this reaction product is added somewhat more than 2 moles of glycerin, and the resulting mixture is heated to a temperature between about 160° C. and 180° C. for about two days. If desired, a current of dry nitrogen or other inert gas may be passed through to speed up the reaction. Condensation occurs between the fatty acid ester of the triethanolamine, and the glycerin, with the production of ethereal reaction products, such as the dihydroxypropyl ether of the mono-fatty acid ester of triethanolamine and other more complex ethereal reaction products.

"*Example 2.*—Triglycerylamine (tri-dihydroxypropylamine) and castor oil are reacted in the proportions of 3 moles of castor oil to 2 moles of triglycerylamine, with the production of a product consisting predominantly of the di-ricinoleic acid ester of the triglycerylamine. The resulting mixture is further heated for a period of about two days, with condensation between the glycerin and the di-ricinoleic acid ester of the triglycerylamine, and the production of corresponding ethereal condensation products.

"*Example 3.*—Blown rapeseed oil and diethanolethyl amine, in the molecular proportions of 3 moles of the amine to 1 mole of the oil are heated together to a temperature between about 150° C. and 180° C. for about two hours, with the production of a reaction product containing a large proportion of the mono-ester of the diethanolethylamine, together with unreacted starting material, glycerin, etc. Something in excess of two moles of glycerin are added to the reaction mixture, and the resulting product is heated to about 150° C. to 180° C. for about two days, with the production of ethereal reaction products of glycerin and the mono-ester of the diethanolethylamine."

Similarly, attention is called to our co-pending application for patent Serial No. 202,986, filed April 19, 1938. Said co-pending application describes compounds of the kind obtainable by a method which comprises heating the triglyceride, a tertiary alkylolamine having more than one alcoholic hydroxyl radical, and a polyhydric alcohol, to a temperature in excess of 100° C. for a period of time sufficient to cause alcoholysis of a triglyceride and condensation between the resulting partially esterified alkylolamine and partially esterified glycerine. The following examples appear in said co-pending application:

"*Example 1.*—Commercial triethanolamine, cocoanut oil and glycerin in the proportions of one mole of cocoanut oil to three moles of triethanolamine and at least one mole of glycerin are heated to a temperature of between about 150° and 180° C. for a period of about fifty hours. If desired, a current of dry nitrogen may be passed through the reaction mixture. The resulting product contains a substantial and preponderating amount of the ether resulting from the condensation of the mono-fatty acid ester of triethanolamine and the mono- and di-fatty acid ester of glycerin, shown in the following formula:

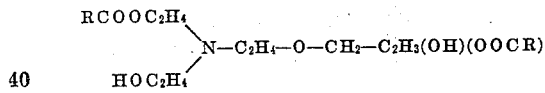

in which R represents the long carbon linked chain of the cocoanut oil fatty acids.

"*Example 2.*—Triglycerylamine (tri-dihydroxypropylamine) and castor oil are reacted in the proportions of three moles of castor oil to two moles of triglycerylamine, for a period of about two hours at a temperature of around 150° to 180° C. To the product so produced, which consists predominantly of the di-ricinoleic acid ester of the triglycerylamine is added about 50% of the monoricinoleic acid ester of glycerin, and the resulting mixture is heated to about 150° to 180° C. for about two days, with the production of mixed ethers of the diricinoleic acid ester of triglycerylamine and the monoricinoleic acid ester of glycerin, of the type formula:

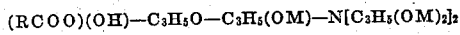

in which two of the M's represent the acyl group corresponding to ricinoleic acid and the other three represent hydrogen, and in which R represents the carbon linked chain characteristic of ricinoleic acid.

"*Example 3.*—Palm kernel oil and diethanolethylamine, in the molecular proportions of three moles of the amine to one mole of the palm kernel oil are heated together with one mole of a polyglycerol to a temperature between about 150° and 180° C. for about two days with the production of a reaction product containing a large proportion of the ether of the mono-fatty acid ester of di-ethanolethylamine and the mono-glyceride corresponding to palm kernel oil, and a large proportion of the ether of the same di-ethanolethylamine ester and the mono-fatty acid ester of the polyglycerol.

"*Example 4.*—An equimolecular mixture of the mono-acetic acid ester of triethanolamine and the mono-stearic acid ester of glycerin are heated together for a period of about fifty hours, with the production of a product containing substantial amounts of the ether of the formula:

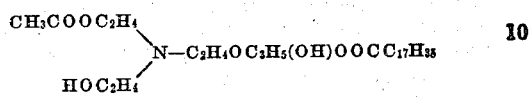

together with more complex ethereal derivatives of the amine and the monoglyceride.

"*Example 5.*—Commercial triethanolamine, a fatty oil and ethylene glycol in the molecular proportions of two moles of the amine to one mole of the oil to one mole of the ethylene glycol are heated to a temperature between about 150° and 180° C. for about two days with the production of a reaction product containing substantial amounts of the ether of the monoester of triethanolamine with the corresponding monoglyceride and the ether of the mono-ester of triethanolamine with the mono-ester of ethylene glycol."

Furthermore, reference is made to our co-pending application for patent, Serial No. 204,852, filed April 28, 1938, which describes compounds obtainable by a method which comprises heating a partially esterified tertiary alkylolamine with a tertiary alkylolamine at a temperature to an excess of 100° C. for a period of time sufficient to effect condensation with the production of an ethereal reaction product. The following examples are taken from said co-pending application:

"*Example 9.*—Commercial triethanolamine and cocoanut oil, in the proportions of 1 mole of cocoanut oil to 3 moles of triethanolamine are heated to a temperature between about 150° C. and 180° C. for a period of about two days. If desired, a current of inert gas, such as dry nitrogen, may be passed through the reaction mixture to speed up the reaction. The resulting product consists mainly of the ether formed by the elimination of a molecule of water from two molecules of the mono-fatty acid ester of triethanolamine, with minor proportions of more complex ethers, ethers of the di-fatty acid ester of triethanolamine, ethers of the fatty acid esters of triethanolamine with glycerin or mono- or diglycerides, etc.

"*Example 10.*—The di-ricinoleic acid ester of triglycerylamine is heated to a temperature between about 150° C. and 180° C. for about two days, with the production of a product consisting mainly of ethers such as di-dihydroxypropyl, mono-hydroxypropylamine di-ricinoleate ether, and more complex ethers formed by the condensation of more than two molecules of the triglycerylamine di-ricinoleate, etc.

"*Example 11.*—Diethanolethylamine monoacetate is heated to a temperature between about 150° C. and 180° C. for about two days with the production of a product consisting mainly of the ether of the formula:

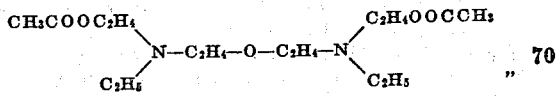

It is to be noted that reference is made to the above three co-pending applications for patent in regard to a further elaboration as to various fatty acid esters, i. e., ordinary vegetable oils, fats, and the like, which may be employed, and also as to further description of acceptable hydroxyamines and polyhydric alcohols which may be employed. It must be recognized that the materials have not lost their basicity to any great degree, as compared with the hydroxyamines from which they were originally derived. Esterification or acylation may tend to reduce the basicity to some degree although in some instances it may even be increased. Such moderate changes are immaterial. The products previously described combine with water to form a base, presumably a substituted ammonium compound. Where more than one amino nitrogen atom is present, they act as a polyamine. Such compounds may combine with acetic acid, hydrochloric acid, lactic acid, nitric acid, butyric acid, phosphoric acid, oxalic acid, or any suitable organic or inorganic acid, to form salts. It is understood that references in the specification and appended claims of the present application to amines, include the basic form and the acid salts as well as the amines themselves.

Generally speaking, it is our preference to obtain the products from amines in which there is no hydrogen atom attached to the amino nitrogen atom. In other words, our preference is to use tertiary amines, such as ethyl diethanolamine, diethyl ethanolamine, triethanolamine, etc. Generally speaking, it is our preference to prepare the products from the tertiary amines, in which there is an alkanolamine radical present, particularly an ethanolamine radical present. Furthermore, it is our preference to employ derivatives of glycerol in forming the ether type compound. Particular attention is directed to the types of compounds as prepared according to the directions in the various four co-pending applications for patents previously referred to. Incidentally, we desire to point out that T previously referred to may represent an RCO radical attached to the amino nitrogen radical. In other words, the product may also be an amide. The RCO in such instances may be derived from an acid having less than 8 carbon atoms or from a detergent-forming acid. However, in such instances the basicity of the amino radical will usually disappear in conversion into an amide; and therefore, in such instances it is usually necessary to have another amino nitrogen atom present which supplies the basicity of the molecule. Such situation is entirely analogous to the presence of an amino nitrogen atom attached to an aryl radical, as in the case of phenyl diethanolamine previously referred to. There is no objection to any non-basic nitrogen atom contributing part of the molecular weight in the form of an arylamine radical, or in the form of an amino radical, provided that the compound still is basic, due to the presence of some other basic amino nitrogen radical of the kind previously described.

Attention is again directed to the fact that although the preceding eleven examples are concerned largely with derivatives of unmodified fatty acids, yet the same procedure is also applicable to modified fatty acid compounds manufactured in the manner previously indicated, to wit, so that such modifications are still convertible into soap or soap-like bodies by agency of suitable alkalies. Similarly, one can prepare compounds of abietic acid, naphthenic acid, or modified forms thereof. It is not necessary to prepare the acylated amino-ethers from esters; but if such procedure is desired, then one can first prepare esters from naphthenic acid, abietic acid, or the like, which correspond to naturally-occurring esters; for instance, one can prepare naphthenin, abietin, or the like. We particularly prefer to prepare compounds characterized by the presence of at least one and preferably more than one hydroxy hydrocarbon group in the final product. Reference is made to the fact that the table appearing in the early part of this application describing a series of representative hydroxy amino-ethers, contains certain species in which the ether linkage involved combination with a monohydric alcohol. Such alcohols can vary from methyl thru octadecyl, or stearyl, and may be normal or branched. In view of this fact, it must be appreciated that the scope of the compounds contemplated as demulsifying agents in the present application may be derived from hydroxy amines and monohydric alcohols, as well as hydroxy amines and dihydric alcohols, or from intermolecular reactions of two or more moles of hydroxy amines. As to the manufacture of such alkyl ethers of hydroxy alkyl amines, it is to be noted that they can be manufactured by means of conventional methods now employed, or by methods which involve modification of previously described methods; or they may be manufactured by the method described in French Patent No. 832,288, dated September 23, 1938, to Zschimmer and Schwarz, Chemische Fabrik Dölau.

Having obtained such alkyl ethers of hydroxy alkylamines by the method suggested in said aforementioned French Patent No. 832,288, or by any other means, one then acylates such products in the same manner previously described. As has been pointed out previously, our preference is to use fatty acids, particularly the acid compounds, such as esters, because they are readily available in the form of naturally-occurring oils and fats. Among the various desirable glycerides are: Castor oil, olive oil, cottonseed oil, rapeseed oil, fish oil, menhaden oil, corn oil, cocoanut oil, palm oil, palm kernel oil, linseed oil, sunflowerseed oil, teaseed oil, neat's-foot oil, etc. Our preference is that the monomeric chemical compound, exclusive of acyl radicals, shall contain less than 60 carbon atoms, and in most instances, shall contain less than 25 carbon atoms.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone, or in combination with other demulsifying procedure, such as the electrical dehydration process.

In the hereto attached claims, reference to the number of carbon atoms in the amino-ether radical contemplates the radical as such, without reference to any attached acyl or oxy-acyl radicals.

Attention is directed to our two co-pending applications Serial No. 284,379 and Serial No. 284,380, and filed July 13, 1939, which disclose related demulsifying agents.

Having thus described our invention, what we claim as new and desire to secure by Letters Patent is:

1. A process for breaking petroleum emulsions of the water-in-oil type, characterized by subjecting the emulsion to the action of a demulsifying agent, comprising an acylated amino-ether of the kind characterized by containing: (A) a radical derived from a basic hydroxy amino-ether, and said radical being of the kind containing at least one amino nitrogen free from attached aryl and amido-linked acyl radicals; said hydroxy amino-ether radical being further characterized by the presence of at least one radical derived from a basic hydroxy amine and being attached by at least one ether linkage to at least one radical selected from the class consisting of glycerol radicals, polyglycerol radicals, polyglycol radicals, basic hydroxy amine radicals, amido hydroxy amine radicals, and aryl alkanolamine radicals; said basic hydroxy amino-ether radical being characterized by containing not over 60 carbon atoms; and (B) an acyl radical derived from a detergent-forming monocarboxy acid having at least 8 carbon atoms and not more than 32 carbon atoms; said acylated amino-ether being additionally characterized by the fact that said aforementioned acyl radical is a substituent for a hydrogen atom of an alcoholic hydroxyl radical.

2. A process for breaking petroleum emulsions of the water-in-oil type, characterized by subjecting the emulsion to the action of a demulsifying agent, comprising a non-aryl, non-amido, acylated amino-ether in which there are no hydrogen atoms attached to any amino nitrogen atom, and of the kind characterized by containing: (A) a radical derived from a basic hydroxy amino-ether, and containing at least one unacylated, unetherized hydroxy hydrocarbon radical; said hydroxy amino-ether radical being further characterized by the presence of at least one radical derived from triethanolamine and being attached by at least one ether linkage to at least one radical selected from the class consisting of glycerol radicals; said basic hydroxy amino-ether radical being characterized by containing not over 60 carbon atoms; and (B) an acyl radical derived from an unmodified fatty acid; said acylated amino-ether being additionally characterized by the fact that aforementioned acyl radical is a substituent for a hydrogen atom of an alcoholic hydroxyl radical.

3. A process for breaking petroleum emulsions of the water-in-oil type, characterized by subjecting the emulsion to the action of a demulsifying agent, comprising a non-aryl, non-amido, acylated amino-ether in which there are no hydrogen atoms attached to any amino nitrogen, and of the kind characterized by containing: (A) a radical derived from a basic hydroxy amino-ether, and containing at least one unacylated, unetherized hydroxy hydrocarbon radical; said hydroxy amino-ether radical being further characterized by the presence of at least one radical derived from triethanolamine and being attached by at least one ether linkage to at least one radical selected from the class consisting of glycerol radicals; said basic hydroxy amino-ether radical being characterized by containing not over 60 carbon atoms; and (B) an acyl radical derived from ricinoleic acid; said acylated amino-ether being additionally characterized by the fact that said aforementioned acyl radical is a substituent for a hydrogen atom of an alcoholic hydroxyl radical.

MELVIN DE GROOTE.
BERNHARD KEISER.
CHARLES M. BLAIR, Jr.